Figure 1:
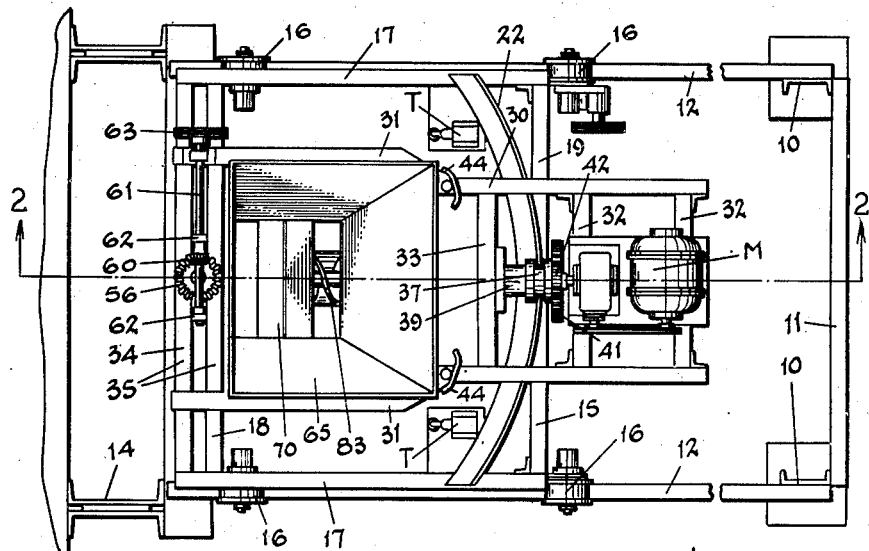

Aug. 23, 1949.    G. W. BATCHELL    2,479,805
METHOD OF AND APPARATUS FOR FEEDING BATCH MATERIALS
Filed Aug. 15, 1946    2 Sheets-Sheet 1

INVENTOR.
George W. Batchell
BY
Freeman Crampton

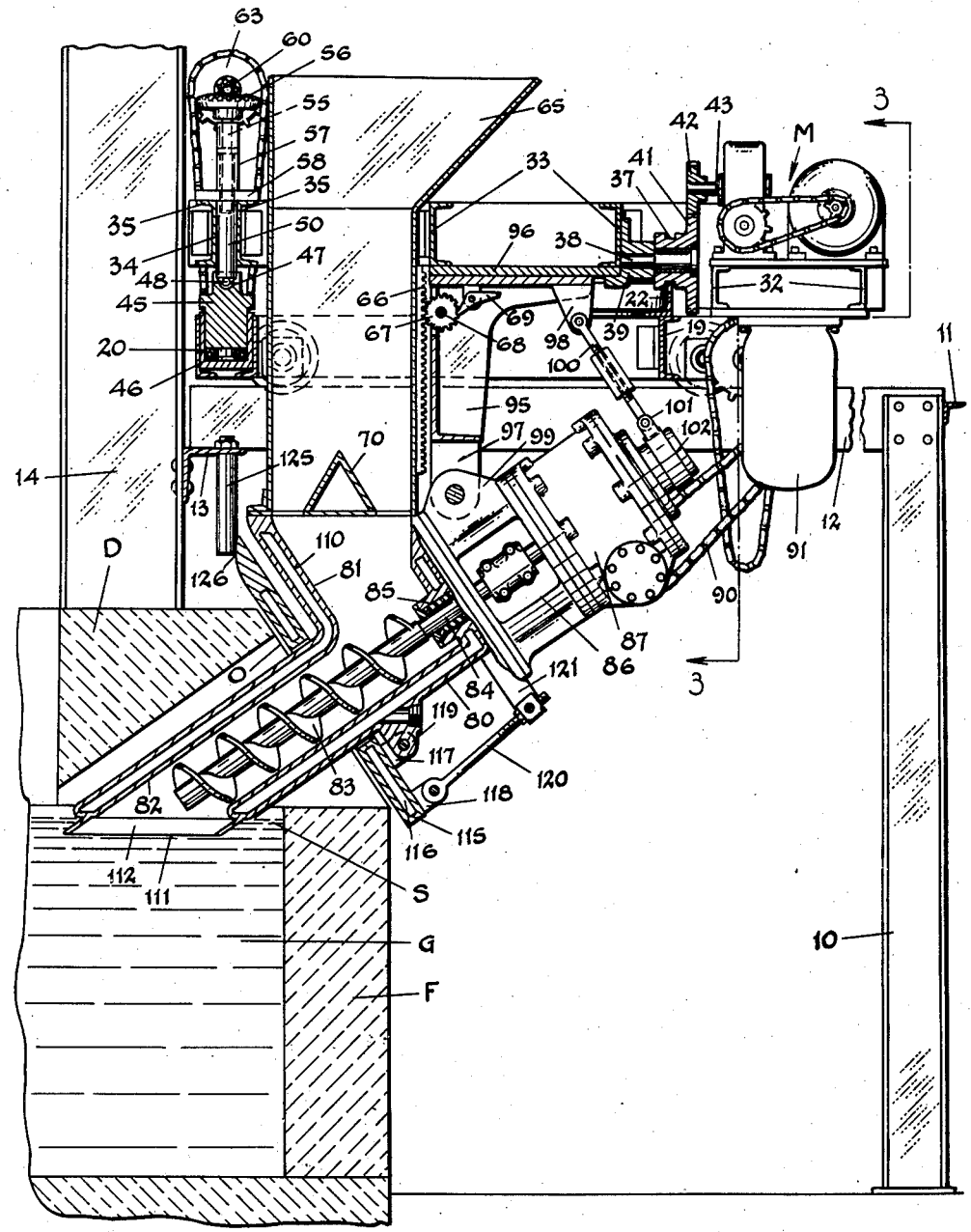

Patented Aug. 23, 1949

2,479,805

UNITED STATES PATENT OFFICE 2,479,805

METHOD OF AND APPARATUS FOR FEEDING BATCH MATERIALS

George W. Batchell, Toledo, Ohio, assignor to Toledo Engineering Company, Inc., Toledo, Ohio, a corporation of Ohio Application August 15, 1946, Serial No. 690,659

13 Claims. (Cl. 49—63)

My invention relates to the art of feeding batch mixtures to a material melting furnace. The invention, particularly, relates to a method of and apparatus for feeding batch mixtures from a batch supply station, exterior of the material melting furnace, to laterally well distributed locations within the perimeter of and below the surface of a molten mass of the material contained within the furnace, while maintaining the desired integrity of the batch mix and with a minimum of dust loss.

It is now well known that charging a glass melting furnace by wholesale or haphazard dumping of batch materials into the molten glass contained in the furnace produces not only faulty glass but, also, in a short time causes physical conditions in the glass melting furnace which materially reduce the efficiency of the same. Feeding, by dumping from hoppers or gravitation through troughs, results in the deposition on the surface of the molten glass of relatively unimmersed floating masses of batch material called "islands" which often pass through the heating zones of the furnace without substantial loss or change of their identity as raw batch. These floating "islands" enter the refining zones and seriously impede and interfere with operations in that zone.

Further, in dump feeding the integrity of the mix, established at the batching station is lost by reason of the fact that certain of the batch materials, being coarser and heavier, separate, in dumping, from the other finer and lighter materials.

The disturbances of the more pulverulent components of the batch attendant to dumping or gravitational feeding cause portions of the same to be thrown into the air and carried off by the stack draft or other drafts prevailing in the furnace. The loss of the pulverulent components from the batch disturbs and disorganizes the integrity of the mix which at the batching station may have been established in strict conformance with formula. Also, the suspended and draft carried pulverulent components cause conditions in the furnace which very soon reduce the natural efficiency thereof. The pulverulent particles are often carried as dust by the stack draft into the regenerator checker work of the furnace to clog the same. The alkaline compound nature of the pulverulent components produces corrosion and fluxing action on the walls of the furnace and its various parts and materially reduces their heat resistant capacity.

To cope with the problems of dumping or gravitational feeding, my predecessors have proposed to introduce batch materials through an opening in the side wall of the furnace and located below the surface of the molten glass therein. By the use of an open-ended cylinder which is charged with batch materials and whose open end registers with the tank opening, a pusher-piston operates to discharge the cylinder's batch charge into the tank through such opening. Others have sought to accomplish the desired solution by directing the batch gravitationally to and in contact with the surface of a driven rotary element or paddle wheel disposed tangentially to or slightly below the surface of the molten glass. Still others suggest introducing the batch gravitationally through a pipe whose discharge orifice occurs in a plane parallel to and slightly spaced above the surface of the molten glass in the tank.

While my predecessors have advanced the art over dump feeding in dealing with individual aspects of the problem, there is no one, prior to my invention, who teaches a method or discloses an apparatus in which all the various aspects of the problem are resolved in a practical and inexpensive manner.

In this latter connection, my invention has for an object to provide an apparatus by which the batch, having been properly mixed in a mixing station, exterior to the melting furnace and vertically displaced from the plane of the surface of the molten glass in the furnace, is vertically moved from such station and delivered to points below the surface of the molten glass within the tank of the furnace. By this arrangement, loss of mix integrity due to gravitational feeding of the mixed batch is materially reduced. In the preferred arrangement of my invention hereinafter described, the batch mix is lowered, as distinct from being dropped or slid, from a batch mixing or supply station disposed above the plane of the surface of the molten glass within the furnace tank. The physical lowering of the mix prevents the gravitational and undesirable separation and segregation of the components of the mix. Also, the batch mix is delivered to the melting tank of the furnace at a constant and controllable mass-rate, as distinct from the unpredictable and uncontrolled gathering or bunching of the mix which occurs in gravitational feeding. Hence, floating masses or "islands" of raw mix within the melting tank are less likely to be formed and the mix is more readily assimilated into the molten glass.

Another object of my invention is to provide, in such an apparatus, a closed conduit through which the batch materials are vertically moved from the batch supply station to points below the molten glass surface, the conduit having a batch discharge orifice below the surface of the molten glass in the furnace tank. The conduit prevents all but localized dissemination of such pulverulent batch materials of the batch mixture as may tend to pass into atmospheric suspension around the batch, due to the physical agitation of the batch in feeding.

The conduit enforces precipitation, within the confines of the conduit, of such suspended pulverulent particles as prevail in the atmosphere about the moving batch and thereby prevents deleterious precipitation in the furnace regenerator and on the walls of the furnace. By reason of the provision of the conduit with its batch discharge orifice disposed below the surface of the molten glass, the batch materials are delivered to the furnace in an immersed and "wetted" condition and are therefore more readily assimilatable by the molten glass and less likely to form undesired floating masses or "islands". The conduit by reason of its confining walls causes the batch mix passing therethrough to exert an outward pressure against confinement which, when applied to the body of the molten glass in the furnace tank, is sufficient to overcome the cohesionary resistance to the penetration and immersion of the batch of such molten body of glass. Such conduit created pressure on the batch as it is emitted from the conduit orifice below the surface of molten glass, also causes a wide distribution of the batch materials over an area somewhat greater than that of the orifice. Thus, the batch is more thinly spread over the lateral melting area of the furnace tank, with resultant increased assimilation into the molten glass.

Another object of my invention is to provide, in such an apparatus, a means by which the discharge of batch materials into the molten glass within the furnace is effected from laterally spaced points to cover an extensive lateral area with regard to the melting chamber of the tank. By this latter provision, the melting tank and the molten glass within it are not subject, in any one particular zone thereof, to the concentrated chilling incidental to the introduction of a comparatively cool charge of batch. Rather, the chilling effect of the introduced batch is thinly and widely distributed and as such is well within the heat compensating capacity of the body of the molten glass within the furnace tank. Also, the wide distribution of the introduced charge makes for ready assimilation, lessens the tendency to create floating masses or "islands" and assures uniformity of glass mix in all melting stages. The latter feature is one of primary importance when the rates of tank tapping and charging are nearly equal or tapping slightly leads charging during periods of forced production.

A still further object of my invention is to provide an apparatus by which the batch materials may be introduced at any desired depth or stratum in the molten glass body, such as one more or less remote from the surface of the molten glass. By such provision, the characteristics of resistance to assimilation and reaction of various batch mixes may be compensated for and the speed of assimilation and the reaction of the batch components may be easily controlled.

A still further object of my invention is to provide an apparatus by which the discharge of the batch materials may be effected continuously for any desired period from a moving point ranging through molten glass in the tank and below the molten glass surface thereof. Such ranging may be effected in a single or multiple of strata or planes below and parallel to the surface of the molten glass or, if desired, along vertical or diagonal lines relative to the surface of the molten glass in the furnace tank.

Thus, the batch materials may be placed and introduced to the molten glass, as desired, relative to the depths of the molten glass and will be discharged in streamer-like or ribbon continuity over any desired area in the furnace tank. The moving point of discharge tends to draw the batch materials then being discharged away from previously discharged materials causing a thinning of the discharged masses and a more general distribution of the batch materials, lessening the tendency of the batch materials to cohere and form floating masses or "islands" and furthering ready assimilation. Further, the provision of this means reduces the need for stirring operations in the melting tank, as the batch materials in their discharge from the moving point produce a stirring agitation of the molten glass in the tank.

Another object of the invention is to provide a method of feeding batch materials to a glass melting furnace which has the essential advantage of delivering the batch mix to and over an area within the melting furnace and below the surface of the molten glass therein of progressively increasing lateral dimensions during the time period of feed. A still further object of the invention is to provide a method of feeding batch materials to a glass melting furnace which has the essential advantage of delivering the batch mix to and over an area within the furnace tank and below the molten glass surface of progressively increasing lateral dimensions in direct proportion to the quantity of batch mix fed to the tank.

Still another object of the invention is to provide a method of feeding batch materials to a glass melting furnace which includes the essential step of delivering the batch mix to within the melting tank and below the surface of the molten glass at a plurality of horizontally spaced points. A yet further object of the invention is to provide a method of feeding batch materials to a glass melting furnace which includes, as an essential thereof, the step of delivering the batch mix to a melting tank periodically from a plurality of spaced points below the surface of the molten glass in the tank.

A further object of the invention is to provide a method of feeding batch materials to a glass melting furnace which includes, as an essential thereof the step of delivering the batch mix to a melting tank at a point below the surface of the molten glass therein under a pressure exerted in a line of force in counter action to the vertical hydrostatic pressure of the molten glass in the tank.

A still further object of the invention is to provide a method of feeding batch materials to a glass melting furnace which includes, as an essential thereof, the step of projecting the batch materials below the surface of the molten glass in the furnace periodically and inwardly of the molten glass from a plurality of spaced points within the perimeter of the molten glass and along lines of projection which are spacially related.

The invention consists in other features and advantages which will appear from the following description and upon examination of the drawings. Method and apparatus containing the invention may utilize various means and partake of different forms and still embody the invention. To illustrate a practical application of the invention, I have selected a method of and apparatus for feeding batch materials as examples of the various structures and details thereof that perform and contain the invention and shall describe the selected method and apparatus hereinafter, it being understood that variations may be made without departing from the spirit of the invention. The particular apparatus selected is shown in the accompanying drawings and it and the selected method are described hereinafter.

Figure 3:
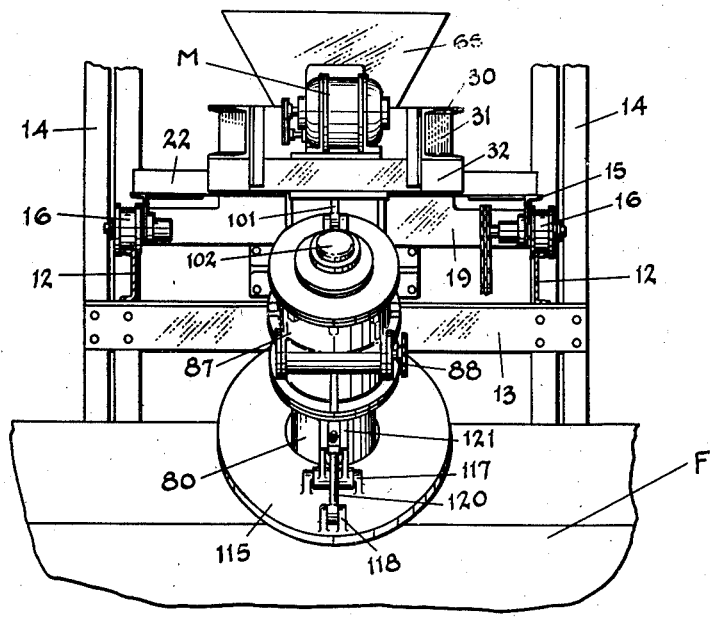

Fig. 1 of the drawings is a plan view of an apparatus for feeding glass batch materials embodying my invention and by means of which the method may be performed. Fig. 2 is an enlarged view of a section taken along the plane of the line 2 indicated in Fig. 1. Fig. 3 is a view of a section taken along the plane of the line 3—3, shown in Fig. 2.

The apparatus selected for illustration in the drawings, in the main, comprises a batch mix source station, a conduit means extending from the source station, both of which are supported for vertical and horizontal movements relative to the melting tank of a glass furnace F, and a material moving means supported within the conduit. The source station may be hopper-like in form and preferably is mounted on a carriage which also supports the conduit and the material moving means, its power driving unit and the oscillatable frame by which the elements are moved laterally of the furnace. The carriage has wheels which run on tracks from a position somewhat remote to the melting furnace F to positions approximately above and in vertical registration with the charging opening O in the doghouse D of the melting furnace F. The carriage may be moved by suitable chain pulleys, manually or otherwise powered.

The carriage supports a track of a somewhat arcuate continuity extending in a plane parallel to the first mentioned track but generally transversing the line of direction of the same in an arcuate path about a center located at one end of the carriage. The oscillatable frame has a wheel which rides upon the arcuate track. The wheel may be power driven by a suitable power unit mounted on the frame and controlled by automatic trip switches which may operate to cause reversal of the direction of rotation of the wheel and a desired continuity of lateral oscillation of the frame.

The frame supports the hopper for containing the batch mix, the feed conduit, the batch moving means of such conduit and the power unit for driving the batch moving means, within the conduit.

The hopper and feed conduit are movably supported on the frame and may be vertically moved relative to the charging opening O of the doghouse D independently of the movement or adjustment of the frame. The movement of the feed conduit is effected to vary the depth at which discharge orifice thereof is disposed below the surface S of the molten glass G in the furnace.

The means for moving the hopper and feed conduit illustrated in the drawings, comprises, in the main, a system of pinions and racks for raising and lowering the hopper which in conjunction with pivotally mounted links of adjustable lengths varies the angle of depression of the feed conduit to locate its discharge orifice at various vertically spaced points within and below the surface of the molten glass in the furnace F.

The feed conduit shown is a cylindrical body, formed of high heat resistant metal and having walls which are cored or chambered to permit circulation of a cooling fluid medium therethrough. The conduit has an extension sleeve or collar which defines the effective discharge orifice of the conduit adapted to be disposed at any desired depth below the surface S of the glass G.

The material moving means within the feed conduit is primarily a feed screw supported in a journal proximate to the upper and receiving end of the conduit and driven by a suitable power unit mounted on the mentioned frame.

Referring now to the drawings, it will be noted that a track trestle is built adjacent to the melting furnace F. The trestle has column 10, a bracing spreader 11, tracks 12. The ends of the tracks 12 proximate to the melting furnace F are connected and supported by an angle bar 13 mounted on the buckstays 14 of the furnace. The disposition of the trestle is such that the end thereof most proximate to the furnace F is substantially in vertical alignment with the charging opening O in the furnace doghouse D.

A carriage 15, having wheels 16, is mounted to run upon the tracks 12 of the trestle. The carriage 15 has side rails 17 and connecting cross pieces 18 and 19. The cross pieces 18 form a housing for and support a bearing thimble 20 mounted substantially midway their lengths which provide a pivot for the heretofore referred to oscillatable frame, and will be described in detail hereinafter. An arcuate track 22 is supported athwart the carriage by the siderails 17 and cross piece 19. The track 22 extends in arcuate relation to the thimble 20 and, as shown, is positioned in spaced relation thereto and proximate to the opposite end of the carriage 15.

Mounted on the carriage 15 is an oscillatable frame 30 formed from a pair of dog-leg side bars 31 and bridging cross-struts 32, brace members 33, and a cross piece 34, formed by two channel irons 35 placed back to back in spaced relation. A frame driving wheel 37 is supported by a stub shaft 38 journaled in a bearing block 39 mounted on a brace member 33 of the frame 30. The wheel 37 is adapted to ride upon the arcuate track 22. The wheel 37 has a gear flange 41 which engages spur 42 keyed to a drive shaft 43 of an electric motor means, indicated generally at M. Thus, the wheel may be driven to move an end of the oscillatable frame 30 through an arc whose axis is coincident with the thimble 20. The motor means M is controlled during a continuous operation of the apparatus by suitable trip switches T which are adjustably positioned on the carriage 15 to be contacted, near the end of each arcuate movement of the frame, by shoes 44 adjustably mounted on the oscillatable frame 30. Operation of each switch T causes the motor means M to reverse the drive of the wheel 37 and to cause the frame to reciprocally oscillate about its pivotal support.

Such pivotal support includes, in the construction shown in the drawing, a flanged bearing stud 45 journaled in the bearing thimble 20 and supported to withstand thrust by suitable bearings 46. The upper end of the stud 45 has a semi-cylindrical recessed crown surface 47 which is adapted to mate with an extending semi-cylindrical surfaced element 48 on the lower end of a hollow strut 50. The relation between the surface 47 and the element 48 of the strut 50 and the provision of stud 45 in journal relation to the thimble 20 allows universal movement of the strut 50 and frame 30 relative to the carriage 15.

Means is provided to raise and lower this end of the frame 30. Such means may be embodied in provision of mounting the strut 50 between the channel irons 35 for controlled slidable axial movement with reference to the frame 30. The strut is moved and held relative to the frame 30 by means of a threaded shaft 55 having a crown gear 56 keyed to one end and, at the other end, adapted to threadably engage a threaded thimble 57 supported on the frame 30 by a block 58. It will be apparent that the effective length of the strut 50 and degree of extension of the element 48 from below the frame 30 may be increased or decreased by rotation of the shaft 55. Thus, the end of the frame 30, proximate to the furnace F, may be raised and lowered as desired. The rotation of the shaft 55 may be effected by a spur gear 60, engaging crown gear 56 and mounted on a shaft 61, journaled in ears 62. The shaft 61 has a chain sprocket 63 keyed thereto which may be rotated by a manually operated chain or other suitable power applied thereto.

The batch mix is preliminarily retained in a hopper 65 mounted on the frame 30. The hopper 65 is vertically adjustable relative to the frame 30 and to its throat portion which is adapted to be engaged by pinion 67 keyed to a shaft 68. The shaft 68 may be rotated by a hand wheel, not shown, or other power means to effect a raising and lowering of the hopper relative to the frame 30, and carriage 15, as well as to the opening O of the furnace F. It is desirable to provide a pawl 69 adapted to engage the pinion 67 and hold it against rotation, as when the hopper is in a raised position. In order to constrain the flow of materials through the throat of the hopper, a baffle 70 may be supported near the discharge end of the throat.

The conduit means of the apparatus communicates with the discharge end of the hopper throat. In the form shown, the conduit means comprises a shell spout 80 having an L-shaped passageway. The shorter leg 81 of the L-shaped passageway is in direct communication with the hopper throat and the longer leg 82 extends, when in a feeding position, as shown in Fig. 2 of the drawings, into the doghouse D of the melting furnace F.

The spout 80 houses a material moving worm 83 disposed in the leg portion 82 of its passageway. The worm 83 has a driving shaft 84 which extends through an opening 85 in the shell, provided with suitable sealing glands, and into a bearing housing 86 and gear box 87 mounted on the spout. The gears in the gear box, not shown, are in train with the gear 88 driven by the chain 90 connected to a link belt extension 91 of the motor means M. Hence, the worm 83, the peripheral edges of whose spiral flanges substantially approximate the walls of the passageway 82, may be rotated to lower the batch mix received from the hopper 65 through the passageway 81.

The spout 80 and its connected housing 86 and gear box 87 are supported on the frame 30 by a bracket 95 attached to a cross plate 96 extending across the frame and suitably connected to brace members 33 and side bars 31. The bracket 95 has an ear 97 and a second ear 98. The ear 97 is adapted to be pivotally connected to a lug portion 99 formed on the bearing housing 86 and the ear 98 is pivotally connected to one end of a link 100 of adjustable length. The other end of the link 100 is pivotally connected, as at 101, to a boss 102 extending from the gear box 87. Thus, the spout 80 is adjustably supported on the oscillatable frame 30, the relative angle of depression of the spout passageway 82 being variable by lengthening or shortening the link 100, in a manner well known in the art. When the link 100 is shortened, the discharge end of the passageway 82 will be positioned, referring to Fig. 2 of the drawings, at a point more proximate to the bottom of the tank of the furnace F and further below the surface S of the molten glass G therein. When the link 100 is lengthened, the discharge end of the passageway 82 will be positioned more proximate to the surface S of the molten glass.

The position of the spout 80 is always, however, such that the charging or inlet end of the passageway 81 is maintained in registration with and in substantially sealed and pressed relation to the discharge end of the throat of the hopper 65. Hence, the positioning of the hopper 65, through the medium of the rack 66 and pinion 67, or the positioning of the spout 80, through the medium of the means just described, requires a repositioning of the other to maintain such registration and seal between the hopper and spout.

The walls of the spout 80 are preferably chambered, as shown at 110, to permit a maintained circulation of a cooling medium therethrough and prevent premature melting of the batch mix being passed therethrough, by the heat radiating from the molten glass G. The discharge end of the passageway 82 of the spout terminates in an orifice 111 defined by a flange projection or collar 112. The collar 112 is preferably disintegral from the metal forming the spout 80 but is attached thereto by a suitably welded joint. The collar 112 serves as an expendable element which, when rendered useless by the heat of the molten glass G, may be readily replaced. The collar 112 thereby prolongs the useful life of the spout 80 and at the same time accomplishes the object of conducting the batch material to a point below the surface S of molten glass.

Preferably, the spout 80 supports a shield or cover plate 115 which is shaped and sized laterally so as to maintain a substantial closure or bafflement of the charging opening O of the melting furnace F. The plate 115 may be chambered, as at 116, to permit circulation of a suitable coolant. The plate has a pair of lugs 117 and 118. The lugs 117 are pivotally connected to a lug 119 formed on the spout and support the plate 115 for angular movement relative to the spout 80. The lugs 118 are pivotally connected to a stove bolt link 120 whose threaded end engages an arm bracket 121 mounted on the spout 80. The threadable adjustment of the position of the bolt 120 relative to the bracket 121 adjusts the angular position of the cover plate 115 relative to the spout 80 and permits of positioning the plate 115 in substantial closing registration with the charging opening O, notwithstanding the adjusted angular position of the spout with reference to said opening. In order to guide the cover plate 115 and give it bearing support during the oscillation of the frame 30, a bearing centering pin 125 may be positioned on the angle bar 13 and be adapted to be engaged by an edge surface 126 of the plate 115. The edge surface 126 may be radiused, as shown in Fig. 2 of the drawings, to provide a universal cam-like bearing for engaging the pin 125.

In operation, the carriage 15 is moved over the tracks 12 toward the furnace F. Coincident therewith the end of the frame 30, the hopper 65 and conduit spout 80 are adjustably raised or lowered by the mechanisms previously described so as to permit the passage of the conduit spout 80 through the opening O into the doghouse D of the furnace F. Such adjustment also locates the conduit spout 80 in a position where the lateral wall of the passage 82 extends through and intersects the surface S of the molten glass at points well within the perimeter of the molten glass and in spaced relation to the vertical molten glass retaining walls of the furnace F. Also the orifice 111 of the spout is located at a desired position and point below the surface S of the molten glass G and in spaced relation to the vertical molten glass retaining walls of the furnace. The hopper 65, which has been or is then charged with batch materials, delivers the same to the passageway 81 of the spout. The motor means M is energized and the frame 30 begins to move arcuately. The movement of the frame 30 causes arcuate movement of the conduit spout 80. The range of movement of the conduit spout 80 has a path and its outer extremities which are well within the perimeter of the molten glass G and spaced from the molten material retaining walls of the furnace F. At the end of an arcuate movement in one direction through a range of movement the motor means, responding to the actuation of one or other switches T by its respective operating shoe 44, reverses the direction of rotation of the frame driving wheel 37 and causes the frame to move arcuately in the other direction through said range of movement.

The batch materials from the hopper 65, at the same time, are drawn off through the passageway 81 of the spout 80 due to the rotation of the worm 83 driven through the belt 90 and gear 88. The worm 83 acts not only to move the batch materials through the passageway 82 of the spout in measured quantity per unit of time but also serves to check the flow of materials from the hopper 65 and prevent, to some extent, undesired gravitational separation of the batch ingredients. The passageways 81 and 82 form a path to which the stream of batch materials are confined and moved from the hopper above the surface S of the molten glass G to a point below said surface. Hence the batch materials are prevented from commingling with the surface or "scum" portions of the molten glass G and are delivered to molten glass in a "wetted" condition conducive to assimilation. The batch materials are delivered through the orifice 111 to each of a plurality of points below the surface S of the molten glass G in the furnace in each sequential period of time in the time utilized in the movement of the frame 30 through its range of movement. The points of discharge from the orifice 111 are so related that a line drawn to all points is of an arcuate extension.

Hence, as the batch materials are ejected through the orifice 111 by reason of the pressure exerted by the worm 83, they are propelled periodically and inwardly into the molten glass from a plurality of points and along spaced lines of projection in counteraction to the vertical hydrostatic pressure of the molten glass G. Further, such manner of introduction assures that the batch materials are thinly spread through the molten glass well within and spaced from the perimeter of the molten glass defined by the walls of the furnace F, markedly reducing the chilling effect of charging and facilitating the ready assimilation of the batch materials.

It will be apparent that as the conduit spout 80 is moved, it will laterally sweep an area within the perimeter of the molten glass G in the furnace F to which the batch materials are delivered. This receiving area is of a lateral dimension which progressively increases in direct proportion to the time utilized to effect feeding or the quantity of batch materials fed. Concentration or piling up of the batch materials at one point is thus eliminated, as are the resultant creation of the undesired "floating islands" of batch materials.

When required, the spout and hopper raising and lowering mechanisms may be operated during delivery of the batch materials to the molten glass. Thus, the batch materials may be delivered at any desired stratum or in several vertically spaced strata below the surface S of the molten glass as well as being projected downwardly through such strata.

The batch materials which, in the movement thereof incidental to feeding, pass into atmospheric suspension are prevented from being disseminated, outside the confines of the conduit spout 80, and, on reaching atmospheric concentration within the conduit, are caused to precipitate on the walls of the spout or the surfaces of the batch materials moving therethrough. Hence, these pulverulent materials are restrained for proper glass batch mixture and prevented from causing undesired clogging and checking of the furnace walls and operating components.

While I have illustrated and described the best form of my invention now known to me and the best means by which the method thereof may be carried out, as required by the statutes, those skilled in the art will readily understand that changes may be made in the disclosed construction without departing from the spirit of my invention as set forth in the appended claims.

I claim:

1. The combination, with a material melting furnace adapted to contain a molten mass of material, of a closed conduit having an inlet opening and a discharge orifice for feeding batch material to the melting furnace; means for moving batch material through the conduit; and means for moving the conduit vertically and horizontally relative to the melting furnace whereby batch material may be introduced through the conduit discharge orifice to within the molten mass at a plurality of different vertically and horizontally spaced points below the uppermost surface of the molten mass.

2. The combination described in claim 1 having in addition thereto means for guiding said conduit movement in response to said horizontally moving means to cause horizontal movement of the conduit discharge orifice through a path below said uppermost surface of the molten mass and in spaced relation to vertical molten material retaining walls of the melting furnace.

3. The combination described in claim 2 having in addition thereto means operatively connected to said conduit horizontally moving means and operated by an element of the last named means for initiating horizontal movement of the conduit in one direction while the conduit is moving horizontally in the opposite direction whereby the conduit discharge orifice reciprocally moves horizontally in said path.

4. The method of feeding batch materials to a material melting furnace that contains a molten mass of such material, which comprises passing a stream of batch materials downwardly through the uppermost surface of the molten mass and into the molten mass and preventing a commingling of the batch material being passed with the surface portions of the molten mass during such passage.

5. The method of feeding batch materials to a material melting furnace that contains a molten mass of such material, which comprises directing batch materials through a predetermined path extending from the space above the uppermost surface of the molten mass and through said surface to a point below said surface, said path and point being between and in spaced relation to the molten material retaining walls of the melting furnace.

6. The method of feeding batch materials to a material melting furnace that contains a molten mass of such material, which comprises delivering a quantity of batch materials free from mixture with the material of the molten mass downwardly to each of a plurality of spaced points below the uppermost surface of the molten mass and discharging said quantity of batch materials into said molten mass from each of said points.

7. The method of feeding batch materials to a material melting furnace that contains a molten mass of such material, which comprises delivering a quantity of batch materials free from mixture with the material of the molten mass downwardly to each of a plurality of spaced points within the molten mass and spaced from the perimeter thereof and discharging said quantity of batch materials into said molten mass from each of said points.

8. The method of feeding batch materials to a material melting furnace that contains a molten mass of such material, which comprises periodically directing a stream of batch materials through one of a plurality of predetermined paths, each path extending from the space above the uppermost surface of the molten mass and through said surface and the molten mass and to one of a plurality of spaced points below said surface, said points being so related that a line drawn therethrough is of arcuate extension.

9. The method of feeding batch materials to a material melting furnace that contains a molten mass of such material, which comprises directing a stream of batch materials to a point below the uppermost surface of the molten mass for a period of time; discontinuing such direction to such point at the termination of such period of time; and directing a stream of batch materials to a second point below said surface of the molten mass and spaced from the first point for another period of time.

10. The method of feeding batch materials to a material melting furnace that contains a molten mass of such material, which comprises directing a stream of batch materials in one of a plurality of predetermined paths, each path extending from the space above the uppermost surface of the molten mass and through said surface to one of a plurality of spaced points below said surface of the molten mass in each period of time of a plurality of consecutive time periods, said points being in spaced relation to the molten material retaining walls of the melting furnace.

11. The method of feeding batch materials to a material melting furnace that contains a molten mass of such material, which comprises propelling a stream of batch materials from a point below the surface of the molten mass along a line extending downwardly into the molten mass for a period of time; discontinuing such propulsion at the termination of such period of time; and propelling a stream of batch materials into the molten mass from another point below the surface of the molten mass spaced from the first point and along another line extending downwardly into the molten mass and spaced from the first line for another period of time.

12. The method of feeding batch materials to a material melting furnace that contains a molten mass of such material, which comprises directing a stream of batch materials in a predetermined path extending from above and through and to a point below the surface of the molten mass for a period of time, discontinuing such direction of the batch materials through said path at the terminus of said period of time, and directing said batch materials in a second predetermined path spaced from said first path and extending from above, through and to another point below the surface of said molten mass for another period of time, said other point being spaced from the first point.

13. The method of feeding batch materials to a material melting furnace that contains a molten mass of such material, which comprises directing a stream of batch materials in a moving predetermined path which extends through the surface of the molten mass in all phases of its movement and which, during consecutive periods of time, sweeps laterally relative to the span of the molten mass over an area in spaced relation to the perimeter of said molten mass.

GEORGE W. BATCHELL.

REFERENCES CITED

The following references are of record in the file of this patent:

UNITED STATES PATENTS

| Number | Name | Date |
|---|---|---|
| 1,761,229 | Pedersen | June 3, 1930 |
| 1,834,631 | Mulholland | Dec. 1, 1931 |
| 1,867,489 | Bennett et al. | July 12, 1932 |
| 1,917,247 | Good | July 11, 1933 |
| 1,922,827 | Stewart | Aug. 15, 1933 |